US009269363B2

(12) United States Patent
Radhakrishnan et al.

(10) Patent No.: US 9,269,363 B2
(45) Date of Patent: Feb. 23, 2016

(54) AUDIO DATA HIDING BASED ON PERCEPTUAL MASKING AND DETECTION BASED ON CODE MULTIPLEXING

(71) Applicant: Dolby Laboratories Licensing Corporation, San Francsico, CA (US)

(72) Inventors: Regunathan Radhakrishnan, Foster City, CA (US); Michael Smithers, McMahons Point (AU); David S. McGrath, Rose Bay (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 199 days.

(21) Appl. No.: 14/066,366

(22) Filed: Oct. 29, 2013

(65) Prior Publication Data

US 2014/0129011 A1 May 8, 2014

Related U.S. Application Data

(60) Provisional application No. 61/721,648, filed on Nov. 2, 2012.

(51) Int. Cl.
*G06F 17/00* (2006.01)
*G10L 19/018* (2013.01)

(52) U.S. Cl.
CPC .................................... *G10L 19/018* (2013.01)

(58) Field of Classification Search
CPC ... G06T 1/0028; G06T 1/0064; G06T 1/0071; G06T 2201/0051; H04N 1/32149; H04N 1/32288; H04N 21/8358
See application file for complete search history.

(56) References Cited

U.S. PATENT DOCUMENTS 6,330,673 B1 12/2001 Levine
7,062,069 B2 6/2006 Rhoads
7,266,466 B2 9/2007 Lemma
7,330,562 B2 2/2008 Hannigan
7,546,467 B2 6/2009 Lemma
7,634,031 B2 12/2009 Baum
7,760,790 B2 7/2010 Baum
7,970,147 B2 6/2011 Mao
8,041,073 B2 10/2011 Baum
8,051,295 B2 11/2011 Brunk
8,194,803 B2 6/2012 Baum (Continued)

FOREIGN PATENT DOCUMENTS

WO 2004/098069 11/2004

OTHER PUBLICATIONS

ATSC: "Digital Audio Compression (AC-3, E-AC-3)", Doc. A/52B, Advanced Television Systems Committee, Washington D.C. Jun. 14, 2005, p. 67.
Kirovski, D et al. "Spread-Spectrum Watermarking of Audo Signals", IEEE Transactions on Signal Processing, vol. 51, No. 4, Apr. 2003.
He, X et al. "Efficiently Synchronized Spread-Spectrum Audio Watermarking with Improved Psychoacoustic Model" Research Letters in Signal Processing, 2008.
Malik, H et al. "Robust Audio Watermarking Using Frequency Selective Spread Spectrum Theory" IEEE, pp. V-385-V-388, May 2004.
Freund, R. Schapire, A Short Introduction to Boosting, Journal of Japanese Society for Artificial Intelligence, 14(5): 771-780, Sep. 1999.

*Primary Examiner* — Andrew C Flanders

(57) ABSTRACT

A spread spectrum data hiding for audio signals is described. A set of pseudo-random noise sequences is added to an audio signal according to a data to be embedded. A masking curve is used to shape the added noise. A transient detection step can be used to control whether a shaped noise sequence is to be added or not. Embedded information is detected by first performing a whitening step and then performing a phase-only correlation with a same set of pseudo-random noise sequences. A detection method that is based on correlation of multiplexed noise sequences with a noise sequence embedded in the audio is also described.

18 Claims, 10 Drawing Sheets

(56) References Cited

U.S. PATENT DOCUMENTS

| | | | | |
|---|---|---|---|---|
| 2002/0106104 | A1 | 8/2002 | Brunk | |
| 2003/0123660 | A1 * | 7/2003 | Fletcher et al. | 380/205 |
| 2006/0204031 | A1 * | 9/2006 | Kogure et al. | 382/100 |
| 2007/0136595 | A1 | 6/2007 | Baum | |
| 2009/0076826 | A1 * | 3/2009 | Voessing et al. | 704/273 |
| 2009/0089585 | A1 * | 4/2009 | Kogure et al. | 713/176 |
| 2009/0187765 | A1 | 7/2009 | Baum | |
| 2011/0023691 | A1 | 2/2011 | Iwase | |
| 2011/0150240 | A1 | 6/2011 | Akiyama | |
| 2011/0223997 | A1 | 9/2011 | Mao | |

* cited by examiner

AUDIO DATA HIDING BASED ON PERCEPTUAL MASKING AND DETECTION BASED ON CODE MULTIPLEXING

CROSS REFERENCE TO RELATED APPLICATIONS

This application claims the benefit of U.S. Provisional Application No. 61/721,648 filed Nov. 2, 2012, which is hereby incorporated by reference in its entirety.

FIELD

The present disclosure relates to audio data embedding and detection. In particular, it relates to audio data hiding based on perceptual masking and detection based on code multiplexing.

BACKGROUND

In a watermarking process the original data is marked with ownership information (watermarking signal) hidden in the original signal. The watermarking signal can be extracted by detection mechanisms and decoded. A widely used watermarking technology is spread spectrum coding. See, e.g., D. Kirovski, H. S. Malvar, "Spread spectrum watermarking of audio signals" IEEE Transactions On Signal Processing, special issue on Data Hiding (2002), incorporated herein by reference in its entirety.

SUMMARY

According to a first aspect of the disclosure, a method to embed data in an audio signal is provided, comprising: selecting a pseudo-random sequence according to desired data bits to be embedded in the audio frame; computing a masking curve based on the audio signal; shaping a frequency spectrum of the pseudo-random sequence in accordance with the masking curve, thus obtaining a shaped frequency spectrum of the pseudo-random noise sequence; adding the shaped frequency spectrum of the pseudo-random noise sequence to a frequency spectrum of the audio signal, the adding occurring on an audio signal frame by audio signal frame basis; and detecting, for audio signal frames, presence or absence of transients, wherein, for audio signal frames for which presence of a transient is detected, the shaped frequency spectrum of the pseudo-random noise sequence is not added to the frequency spectrum of the audio signal.

According to a second aspect of the disclosure, a computer-readable storage medium having stored thereon computer-executable instructions executable by a processor to detect embedded data in an audio signal is provided, comprising: performing a phase-only correlation between a frequency spectrum of the audio signal with embedded data and a noise sequence; and performing a detection decision based on a result of the phase-only correlation.

According to a third aspect of the disclosure, an audio signal receiving arrangement comprising a first device and a second device is provided, the first device comprising a data embedder to embed data in the audio signal, the second device comprising a data detector to detect the data embedded in the audio signal and adapt processing on the second device according to the extracted data, the data embedder being operative to embed the data in the audio signal according to the method of the above mentioned first aspect, the data detector being operative to detect the watermark embedded in the audio signal according to a method comprising: performing a phase-only correlation between a frequency spectrum of the audio signal with embedded data and a noise sequence; and performing a detection decision based on a result of the phase-only correlation.

According to a fourth aspect of the disclosure, an audio signal receiving product comprising a computer system having an executable program executable to implement a first process and a second process is provided, the first process embedding data in the audio signal, the second process detecting the data embedded in the audio signal, the second process being adapted according to the detected data, the first process operating according to the method of the above mentioned first aspect, the second process operating according to a method comprising: performing a phase-only correlation between a frequency spectrum of the audio signal with embedded data and a noise sequence; and performing a detection decision based on a result of the phase-only correlation.

According to a fifth aspect of the disclosure, a system to embed data in an audio signal is provided, the system comprising: a processor configured to: select a pseudo-random sequence according to desired data bits to be embedded in the audio frame; compute a masking curve based on the audio signal; shape a frequency spectrum of the pseudo-random sequence in accordance with the masking curve, thus obtaining a shaped frequency spectrum of the pseudo-random noise sequence; add the shaped frequency spectrum of the pseudo-random noise sequence to a frequency spectrum of the audio signal, the adding occurring on an audio signal frame by audio signal frame basis; and detect, for audio signal frames, presence or absence of transients, wherein, for audio signal frames for which presence of a transient is detected, the shaped frequency spectrum of the pseudo-random noise sequence is not added to the frequency spectrum of the audio signal.

According to a sixth aspect of the disclosure, a system to detect embedded data in an audio signal is provided, the system comprising: a processor configured to: perform a phase-only correlation between a frequency spectrum of the audio signal with embedded data and a noise sequence; and perform a detection decision based on a result of the phase-only correlation.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Figure 1:
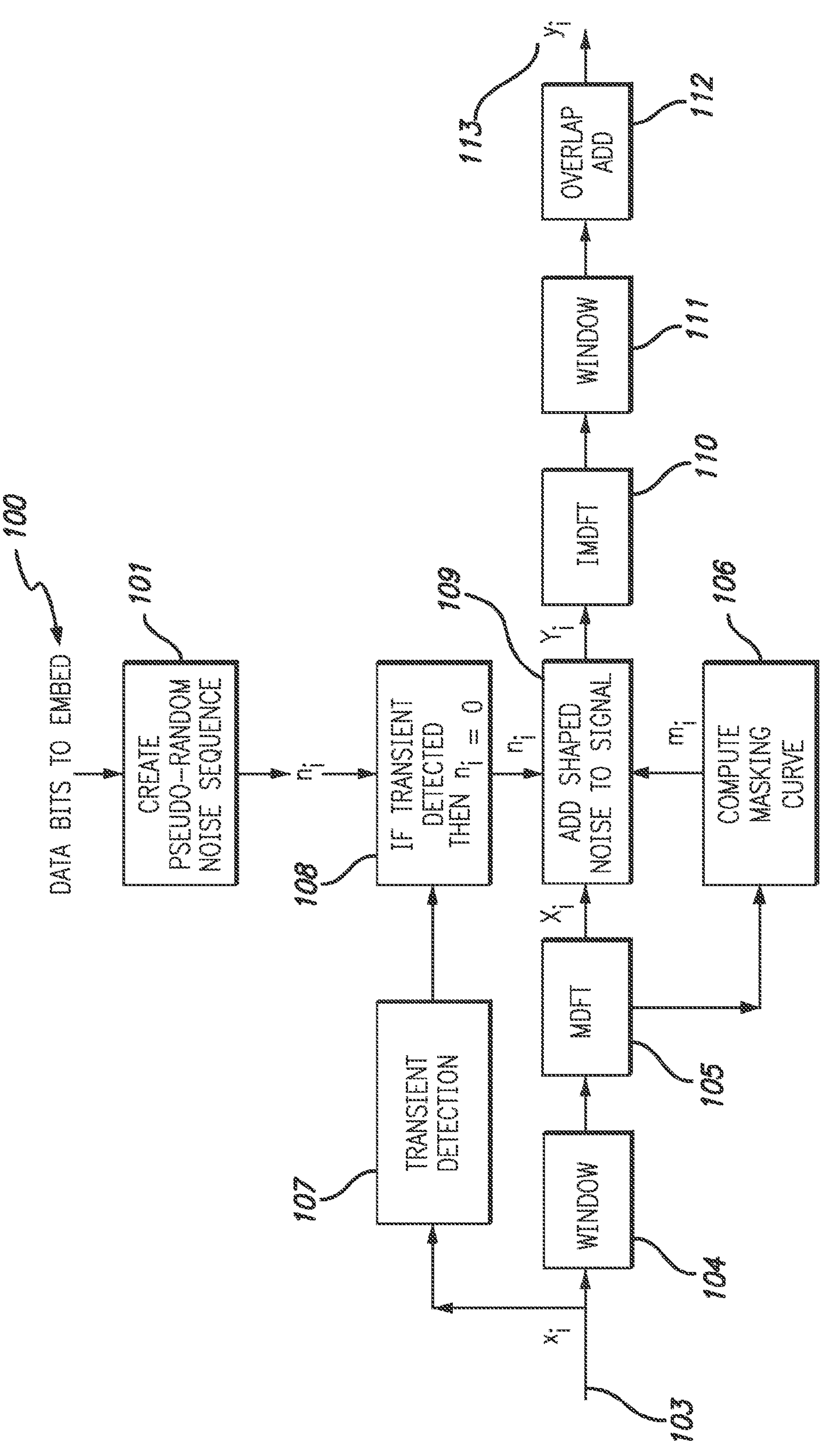
FIG. 1 shows an embedding procedure or operational sequence for an audio data hiding according to an embodiment of the disclosure.

FIG. 1 shows some functional blocks for implementing embedding for spread spectrum audio data hiding and efficient detection in accordance with an embodiment of the present disclosure. The method, operational sequence or system of FIG. 1 is a computer- or processor-based method or system. Consequently, it will be understood that the functional blocks shown in FIG. 1 as well as in several other figures can be implemented in a computer system as is described below using FIG. 11.

In the embodiment of FIG. 1, pseudo-random noise sequences are created to represent a plurality of data bits (100) to embed in an input audio signal. A pseudo-random noise sequence (101) is then created by concatenating noise sequences from a set of such pseudo-random sequences. For example, pseudo-random noise sequence n is formed by concatenating an L number of pseudo-random sequences $\{n_0, n_1, \ldots n_{L-1}\}$.

Each noise sequence in the set of pseudo-random sequences represents $\log_2 L$ bits of the data bits to embed in the audio signal. For example, one data bit can be represented using two noise sequences: $n_0$ and $n_1$. If an input data bit sequence to be embedded in the audio signal is 0001, then the input data bit sequence can be represented as $n_0n_0n_0n_1$ where $n_0=0$ and $n_1=1$. On the other hand, if each noise sequence represents two data bits, then the same input data bit sequence above can be represented by $n_0n_1$ by using four noise sequences $n_0$ to $n_3$, where $n_0=00$, $n_1=01$, $n_2=10$ and $n_3=11$.

Thus, for the above example, by increasing the number of noise sequences L from two to four, the embedding rate is doubled. Generally as the value of L increases, the embedding procedure can have a higher embedding rate, because each noise sequence can now represent more data bits to be embedded at a time.

Each of the pseudo-random sequences in the set $\{n_0, n_1, \ldots n_{L-1}\}$ can be derived, for example, from a Gaussian random vector. The Gaussian random vector size can be, for example, a length of 1536 audio samples at 48 kHz, which translates to an embedding rate of 48000/1536 or 31.25 bps (bits per second). As noted above, to increase the embedding rate, an embedding procedure with more noise sequences can be used.

Turning now to the input audio signal, such signal is divided into multiple frames $x_i$ (103), each having a length audio_frame_len. By way of example and not of limitation, audio_frame_len can be 512 samples.

Figure 2:
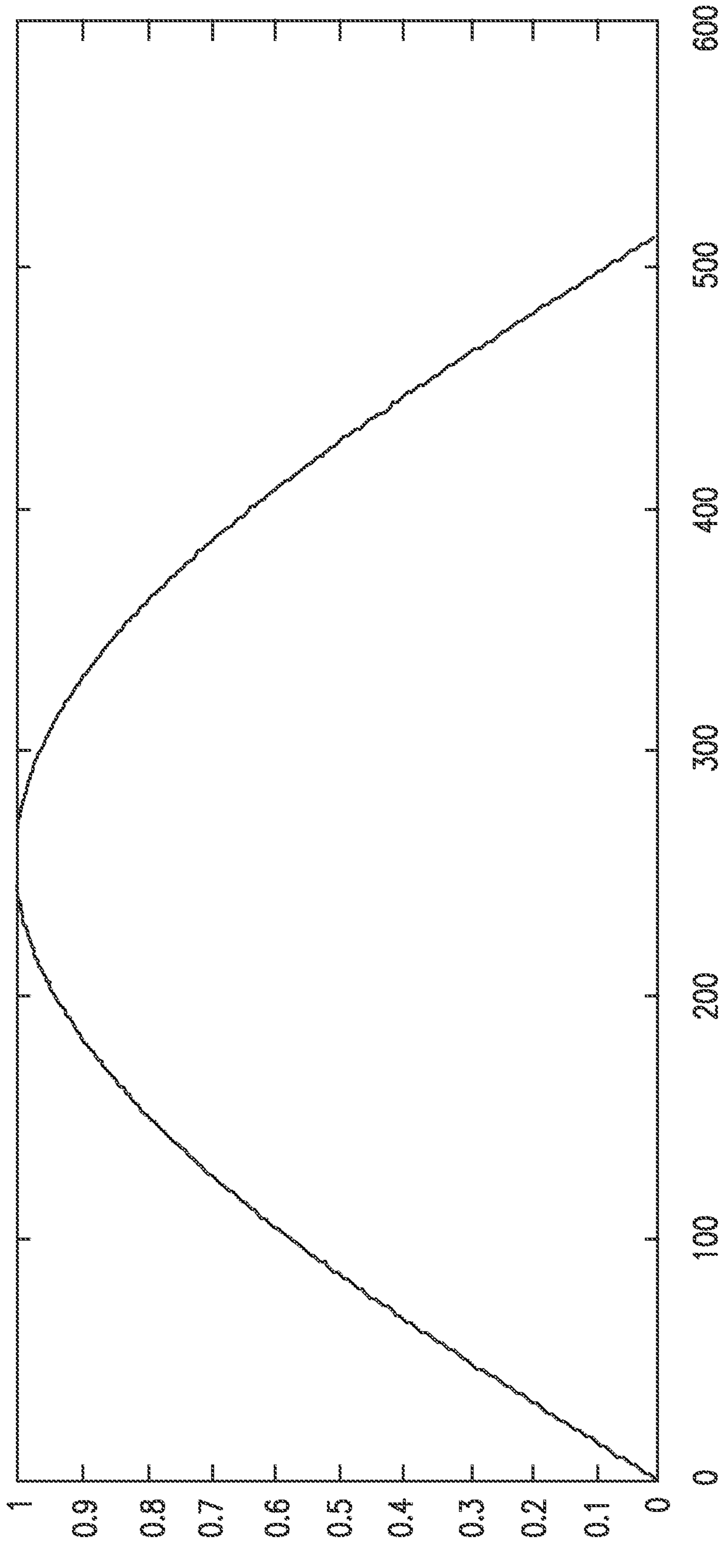
FIG. 2 shows a window function for use with the embodiment of FIG. 1.

As shown in box (104), each frame of the input audio is multiplied by a window function of the same length as the frame (or audio_frame_len). By way of example, a Hanning window can be used. The window function according to the present disclosure can be derived from a Hanning window as follows:

$$w(i) = \frac{\sqrt{h(i)}}{\sqrt{h(i)^2 + h\left(i + \frac{\text{audio\_frame\_len}}{2}\right)^2}},$$

where h(i) represents an $i^{th}$ Hanning window sample. FIG. 2 shows a window function derived from a Hanning window. While a Hanning window is shown in FIG. 2, the person skilled in the art will understand that several types of windows can be used for the purposes of the present disclosure.

The windowed frame is then transformed (105) using, for example, a Modified Discrete Fourier Transform (MDFT). The transformed window frame can be represented as X, while the transform coefficients (or "bins") can be represented by $X_i$ as shown by the output of box (105). Several kinds of transformations can be used for the purposes of the present disclosure, such as a Fast Fourier Transform (FFT).

As shown in box (106), a masking curve comprised of coefficients $m_i$ is computed from the transform coefficients $x_i$. The masking curve comprises coefficients $m_i$ having a same dimensionality as the transform coefficients $X_i$ and specifies a maximum noise energy in decibel scale (dB) that can be added per bin without the noise energy being audible. In other words, if an added watermark signal's energy (represented by a pseudo-random noise sequence) is below the masking curve, the watermark is then inaudible. An exemplary masking curve computation can be found, for example, in the "Dolby Digital" standard, seeATSC: "Digital Audio Compression (AC-3, E-AC-3)," Doc. A/52B, Advanced Television Systems Committee, Washington, D.C., 14 Jun. 2005 page 67, incorporated herein by reference in its entirety.

In the embodiment of FIG. 1, transient analysis (107) is also performed. Transients are short, sharp changes present in a frame which may disturb a steady-state operation of a filter. Statistically, transients do not occur frequently. However, if transients are detected (107) in an analyzed frame $x_i$, it is desirable not add any noise signal (108) to the audio frame because the added noise could be audible. If there are no transients, then the audio frame can be modified to include the noise sequence $n_i$ to be embedded.

Figure 3:
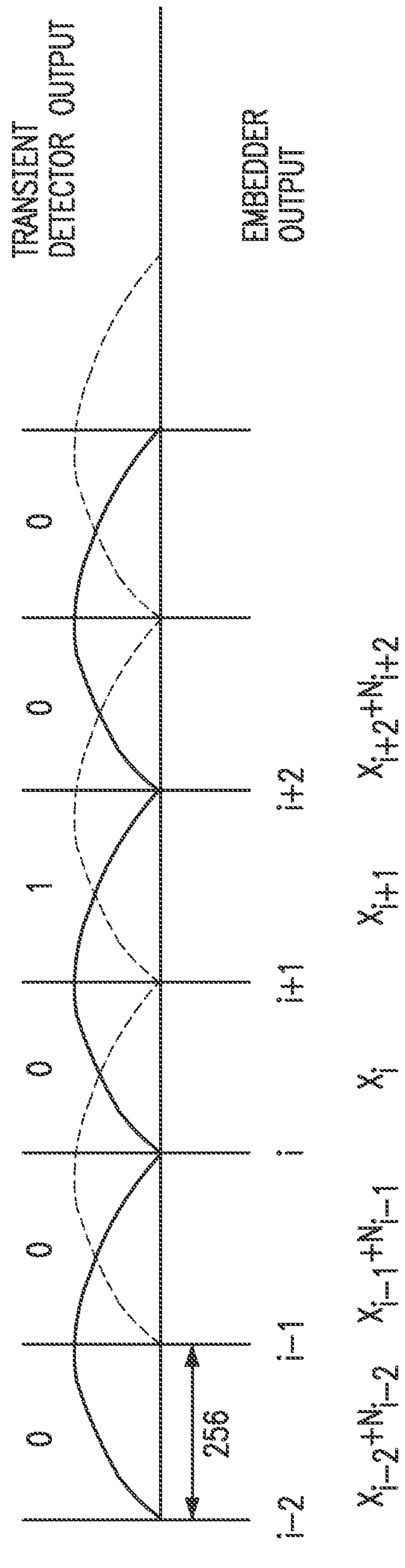
FIG. 3 shows an embedder behavior when detecting transients.

FIG. 3 shows an embedder behavior when detecting transients. As shown in FIG. 3, during the determination for transients, a whole frame (for example one that comprises of 512 samples) is divided into smaller windows, e.g., two windows of 256 samples for each frame. In particular, the first two windows of FIG. 3 refer to frame $X_{i-2}$ shown with a solid line, the second and third windows refer to frame $X_{i-1}$ shown with a dotted line, the third and fourth windows refer to frame $X_i$ shown with a solid line, and so on. In accordance with the embodiment shown in FIG. 3, an intra-frame control can be performed in order to decide when to add noise within a frame where a transient is not detected and not to add noise within a frame when a transient is detected. An intra-frame determination is more beneficial than making a determination of not adding noise to the whole frame if a transient is found in only one location of the whole frame.

If the transient detector's output is 1 in either half of a frame, noise embedding is turned off for that frame. For example, for frame $X_i$, FIG. 3 shows that the second half of the frame (i.e. the fourth window of FIG. 3) has a transient detector output of 1 and for frame $X_{i+1}$, the first half of the frame (the same fourth window) has a transient detector output of 1. In both of these frames, noise embedding is turned off. Therefore, when frames $X_i$ and $X_{i+1}$ are processed in the block (109) of FIG. 1, as later discussed, the shaped frequency spectrum of the pseudo-random noise sequence is not added to the frequency spectrum of the audio signal, differently from what occurs, for example, for frames $X_{i-2}$, $X_{i-1}$, and $X_{i+2}$ shown in FIG. 3.

Turning now to the description of FIG. 1, addition of the noise sequence $n_i$ to the frequency spectrum $X_i$ of the audio signal occurs in box (109). Within a noise adding step, a transform domain representation of a current noise frame (denoted as $N_i$) is obtained by windowing and performing a transform of the current noise frame in the time domain (denoted as $n_i$), similarly to what was shown in boxes (104) and (105) with reference to the audio signal. Afterwards, each bin $N_i$ of the noise sequence can be modulated in accordance with the coefficients $m_i$ of the masking curve (106). In particular, gain values (denoted as $g_i$) can be obtained and then applied as a multiplicative value for each bin of $N_i$ based on the masking curve as follows:

$$g_i = 10^{\frac{(m_i * \Delta)}{20}}.$$

Here, Δ can be used to vary a watermark signal strength to allow for trade-offs between robustness and audibility of the watermark.

Finally in the noise adding step, a modified transform coefficient (identified as $Y_i$) can be obtained where $Y_i = X_i + (g_i \cdot * N_i)$. An operation .* represents element wise multiplication between the gain vector $g_i$ and the noise transform coefficients $N_i$. As already noted above, this step can be omitted if a transient is detected in a current frame $x_i$. In particular, in a case where a transient is detected, the modified transform coefficient $Y_i$ will be equivalent to $X_i$. Turning off embedding noise in presence of transients in a frame is useful, as it may allow, in some embodiments, to obtain a cleaner signal before the transient's attack. The presence of any noise preceding the transient's attack can be perceived by the human ear and hence can degrade the quality of watermarked audio.

Windowed time domain samples are then overlapped and added (112) with a second half of a previous frame's samples. Since in the embodiment of FIG. 1 frame $y_{i-1}$ and frame $y_i$ are both multiplied by the same window function, the trailing part of frame $y_{i-1}$'s window function overlaps with the starting part of the frame $y_i$'s window function. Since the window function is designed in such a way that the trailing part and the starting part add up to 1.0, the overlap add procedure of block (112) provides perfect reconstruction for the overlapping section of frame $y_{i-1}$ and frame $y_i$, assuming that both frames are not modified.

The outcome after the embedding procedure is a watermarked signal frame (denoted as $y_i$). Afterwards, a subsequent frame of audio samples is obtained by advancing the samples and then repeating the above operations.

Figure 4:
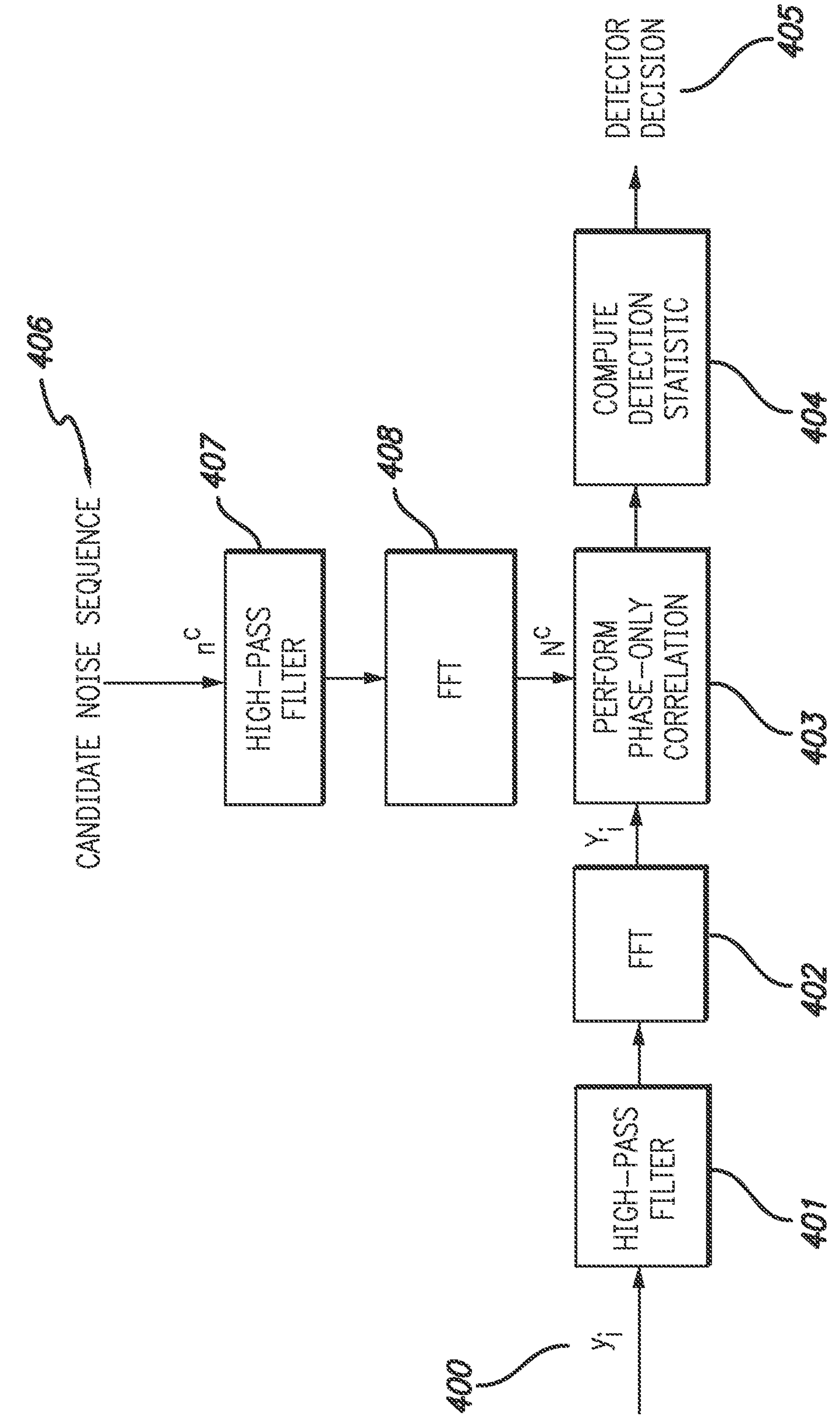
FIG. 4 shows a detection method or operational sequence in accordance with an embodiment of the present disclosure.

FIG. 4 shows a detection method or operational sequence in accordance with an embodiment of the present disclosure. The description of the embodiment of FIG. 4 will assume alignment between embedding and detection. Otherwise, a synchronization step can be used before performing the detection to make sure that alignment is satisfied. Synchronization methods are known in the art. See, for example, D. Kirovski, H. S. Malvar, "Spread-Spectrum Watermarking of Audio Signals" IEEE Transactions on Signal Processing, Vol. 51, No. 4, April 2003, incorporated herein by reference in its entirety, section IIIB of which describes a synchronization search algorithm that computes multiple correlation scores. Reference can also be made to X. He, M. Scordilis, "Efficiently Synchronized Spread-Spectrum Audio Watermarking with Improved Psychoacoustic Model" Research Letters in Signal Processing (2008), also incorporated herein by reference in its entirety, which describes synchronization by means of embedding synchronization codes, or H. Malik, A. Khokhar, R. Ansari, "Robust Audio Watermarking Using Frequency Selective Spread Spectrum Theory" Proc. ICASSP'04, Canada, May 2004, also incorporated herein by reference in its entirety, which describes synchronization by means of detecting salient points in the audio. Embedding is always done at such salient points in the audio.

An input watermarked signal is divided into non-overlapping frames $y_i$ (400), each having a length of, for example 1536 samples. The length of each frame corresponds to the length of each noise sequence previously embedded into the frame. A candidate noise sequence (406) to be detected within the input watermarked frame can be identified as $n^c$.

As shown by boxes (401) and (407), a high-pass filter is used on each audio frame sample $y_i$ and candidate noise sequence $n^c$, respectively. The high-pass filter improves a correlation score between the candidate noise sequence $n^c$ and the embedded noise sequence in the audio frame sample $y_i$.

As shown in boxes (402) and (408), a frequency domain representation of the time domain input audio frame $y_i$ and the candidate noise sequence $n^c$ is obtained, respectively using, for example, a Fast Fourier Transform (FFT). Each of the frequency domain representations $Y_i$ and $N^c$ have the same length.

As shown in box (403), phase-only correlation is performed between the frequency domain representations of the candidate noise sequence $N^c$ and the watermarked audio frame $Y_i$. To perform the phase-only correlation, first a spectrum of the input watermarked audio frame is whitened. A whitened spectrum of the watermarked input audio frame can be represented as $Y_i^w$ where $Y_i^w = \text{sign}(Y_i)$.

$Y_i$ is a vector of complex numbers and the operation "sign ()" of a complex number a+ib divides the complex number by the magnitude of the complex number $$\left(\text{sign}(a + ib) = \frac{(a * ib)}{\sqrt{(a^2 * b^2)}}\right).$$

By obtaining $Y_i^w$, the phase-only correlation can ignore the magnitude values in each frequency bin of the input audio frame while retaining phase information. The magnitude values in each frequency bin can be ignored because the magnitude values are all normalized. The phase-only correlation can be performed using the following expression:

$$\text{corr\_vals} = \text{IFFT}\,(\text{conj}(Y_i^w) \cdot * N^c).$$

Here, IFFT refers to an inverse fast Fourier transform. conj refers to a complex conjugate of $Y_i^w$. corr_vals can be rearranged so that the correlation value at zero-lag is at a center.

Figure 5:
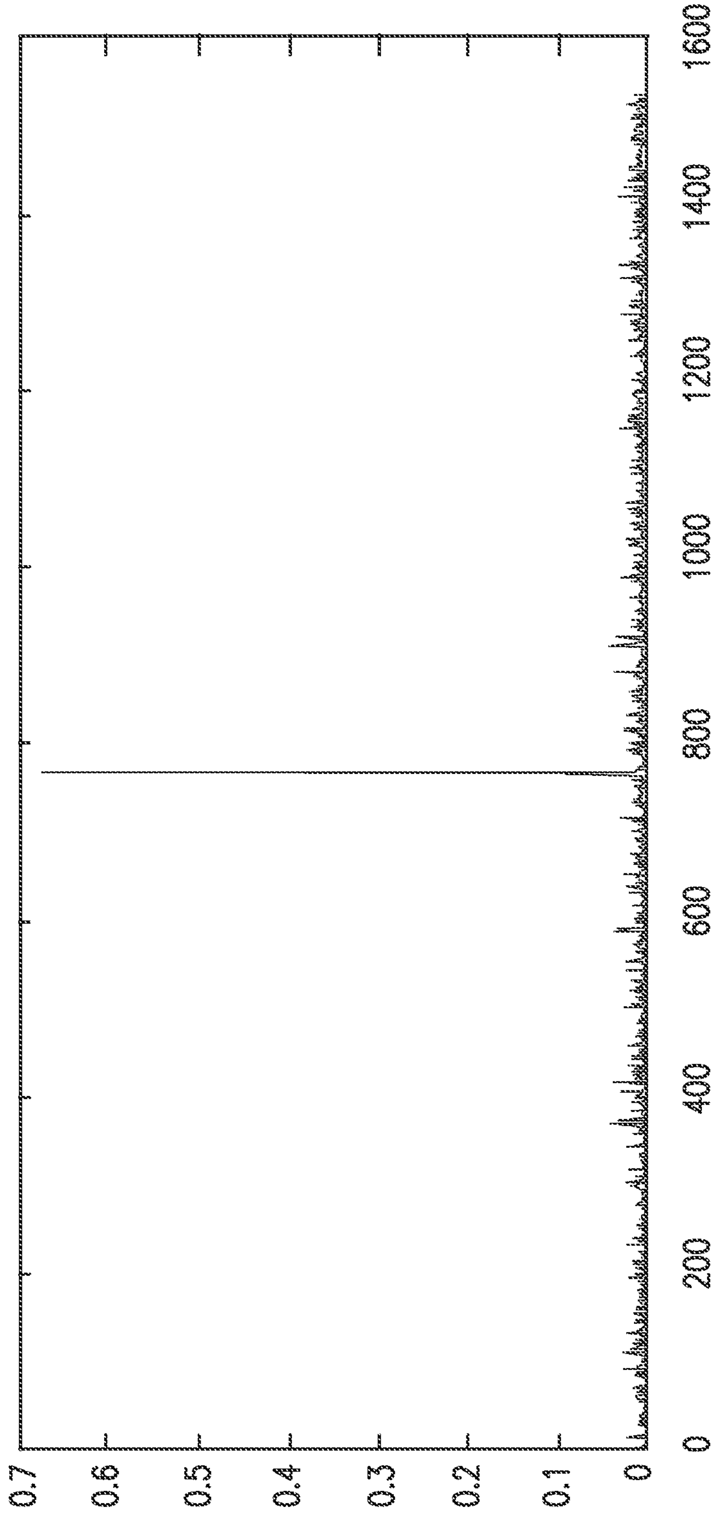
FIG. 5 shows a correlation value vector for use in the embodiment of FIG. 4.

The phase-only correlation can also square each element in corr_vals vector so that the corr_vals vector can be positive. FIG. 5 shows a squared re-arranged correlation value (corr_vals) vector.

Figure 6:
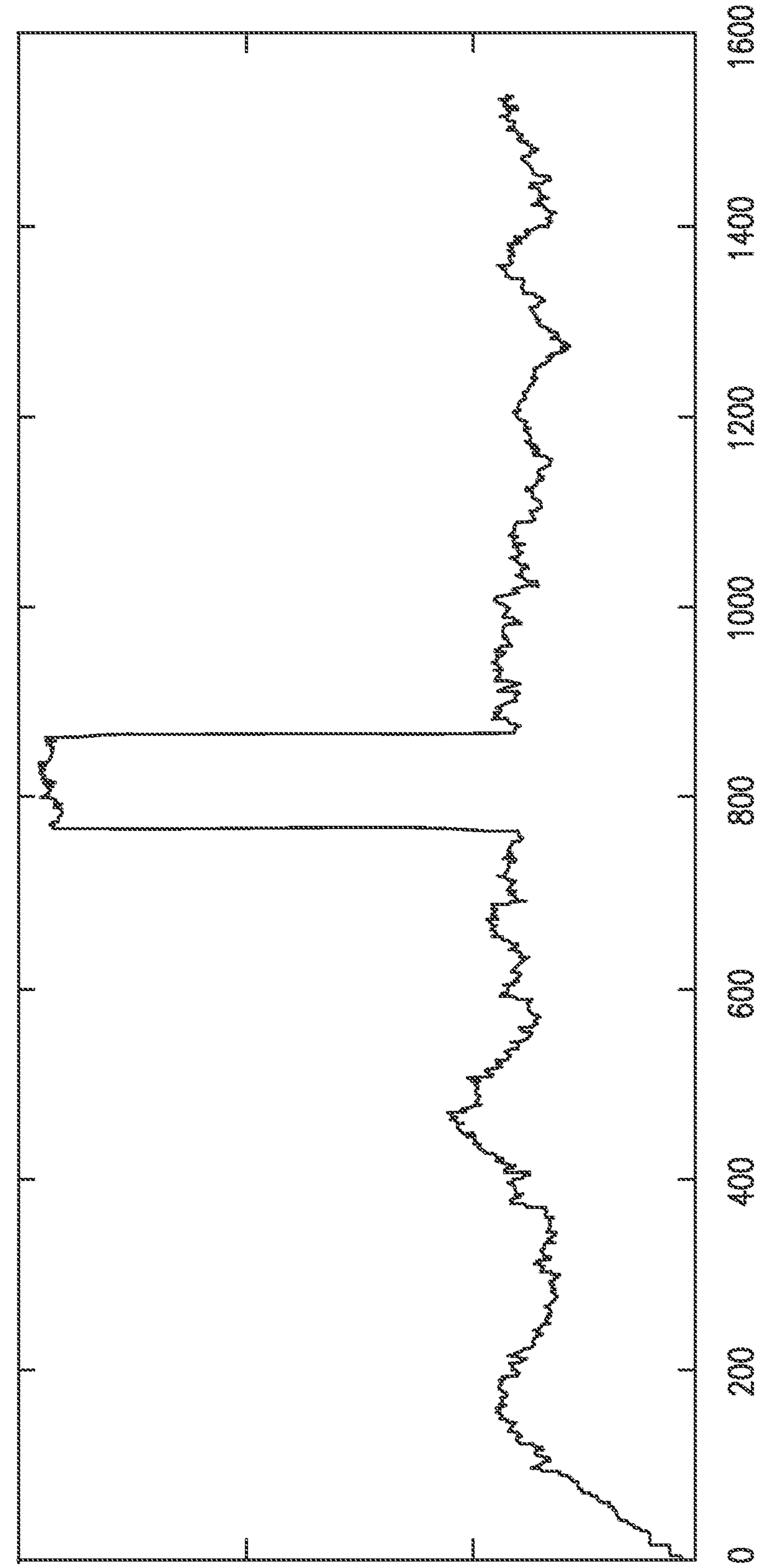
FIG. 6 shows a filtered correlation value for use in the embodiment of FIG. 4.
Figure 7A:
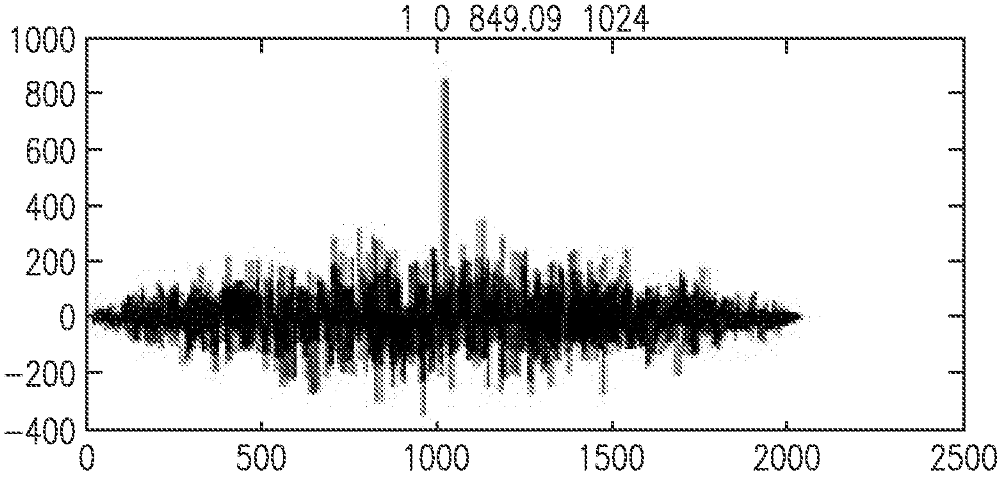
FIGS. 7A-7D show a correlation peak shift for each of a candidate noise sequence embedded in an audio signal in accordance with the embodiment of FIG. 4.
Figure 7B:
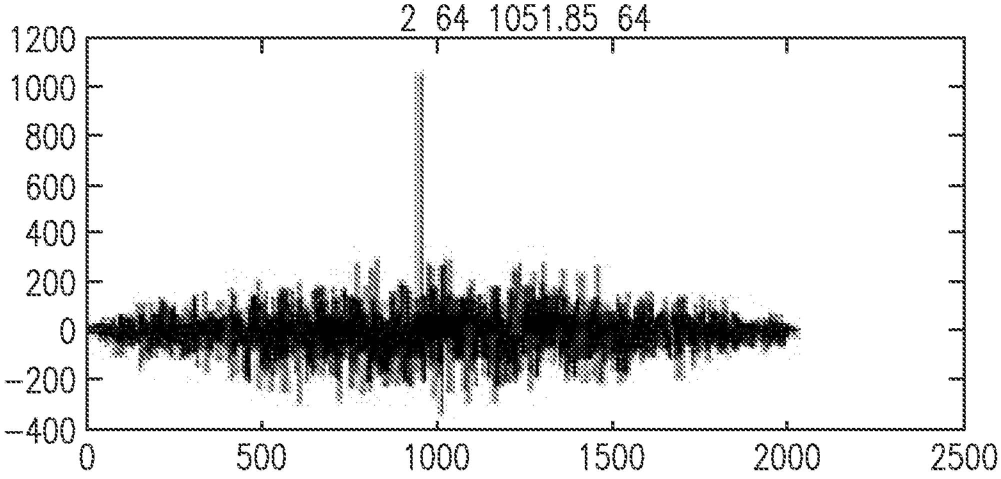
Figure 7C:
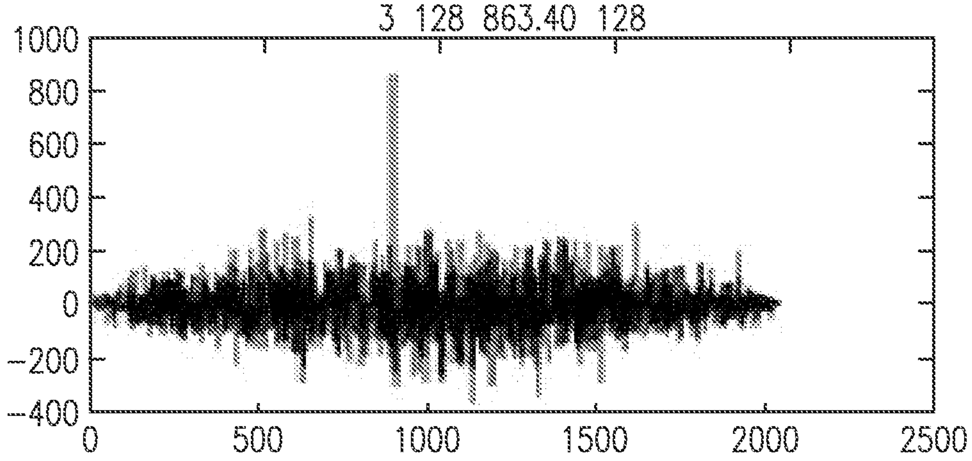
Figure 7D:
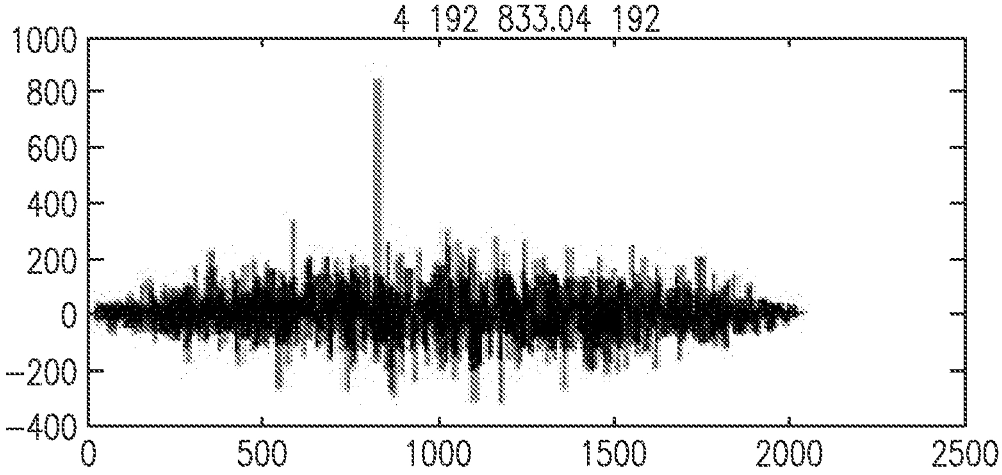

In a further step of the detection method shown in FIG. 4, a detection statistic is computed from the squared re-arranged correlation value vector. In a first step to compute the detection statistic, the squared rearranged correlation value vector is processed through a low-pass filter to obtain a filtered correlation value (filtered_corr_vals) vector. FIG. 6 shows an example of a filtered correlation value (filtered_corr_vals) vector.

In a second step to compute the detection statistic, a difference between a maximum of the filtered corr_vals in two ranges (range1 and range2) is computed. Range1 refers to indices where a correlation peak can be expected to appear. Range2 refers to the indices where the correlation peak cannot be expected to appear. In an embodiment of the present disclosure, range1 can be a vector with indices between 750 and 800 while range2 can be a vector with indices between 300 and 650.

detection_statistic=max(filtered_corr_vals(range1)−max(filtered_corr_vals(range2));

As disclosed above with reference to the diagram of FIG. 1, to increase the embedding rate, a set of L pseudo-random sequences $\{n_0, n_1, n_{L-1}\}$ can be used, where each noise sequence represents $\log_2 L$ bits of the data bits to embed in the audio signal. For example, 16 noise sequences can represent four data bits by embedding one noise sequence. However, at a detector, the embodiment would have to perform 16 correlation computations as described in a following equation:

$$\text{corr\_vals}=\text{IFFT}(\text{conj}(Y_i^w)\cdot{*}N^c).$$

Here, $N^c$ is the transform of the candidate noise sequence, which could be one of the 16 noise sequences to be detected. The correlation computation can be repeated up to 16 times as the detector attempts to identify the embedded noise sequence.

In an embodiment of the present disclosure, a correlation detection method to perform detection with a single correlation computation irrespective of a number of candidate noise sequences to be detected is presented. In a first step of the correlation detection method, each unmultiplexed code is circularly shifted by a specific shift amount to obtain another set of noise sequences. A new set of shifted noise sequences can be identified as $\{\langle n_0\rangle_{s0}, \langle n_1\rangle_{s1}, \ldots \langle N_{L-1}\rangle_{sL-1}\}$. $\langle n_0\rangle_{s0}$ refers to a circularly shifted noise sequence $n_0$ by an amount of $s_0$. An example of $s_i$ values for a 16 candidate noise sequence can be as follows: $s_0=0$, $s_1=64$, $s_2=128 \ldots s_{15}=960$.

In a second step of the correlation detection method, multiplexed codes are obtained by summing the elements of the above set. The multiplexed codes are identified as $n_{all}=\langle n_0\rangle_{s0}+\langle n_1\rangle_{s1}+\ldots+\langle N_{L-1}\rangle_{sL-1}$.

In a third step of the correlation detection method, the phase-only correlation computation already described with reference to box (403) of FIG. 4 is performed. The correlation computation can be described as follows:

$$\text{corr\_vals}=\text{IFFT}(\text{conj}(Y_i^w)\cdot{*}N^c).$$

Since an unshifted noise sequence is embedded into the audio signal and is correlated with a summation of circularly shifted noise sequences $n_{all}$, a location of the correlation peak encodes information about the unshifted noise sequence embedded in the audio signal. The embedded noise sequence in the audio signal can be identified as $n_i$. A correlation can be described as follows:

$$\text{corr}(n_{all}, n_i)=\text{corr}(\langle n_0\rangle s_0, n_i)+\text{corr}(\langle n_1\rangle s_1, n_i)+\ldots \text{corr}(\langle n_i\rangle s_i, n_i)+\ldots \text{corr}(\langle n_{L-1}\rangle s_{L-1}, n_i)=\text{corr}(\langle ni\rangle s_i, n_i).$$

It should be noted that $\text{corr}(n_{all}, n_i)=\text{corr}(\langle ni\rangle s_i, n_i)$ as all other correlation terms tend to zero meaning a correlation peak shifted by s, can be expected. FIGS. 7A-7D show a correlation peaks shift for each of the candidate noise sequences embedded in an audio.

As long as the correlation peaks are not too close, then it would be possible to identify a peak associated for a particular candidate noise sequence based on the known shift amount. It could happen, through inclusion of all the candidate noise sequences in one correlation computation that the peaks would end up crowding making a particular peak indistinguishable from adjacent peaks. Thus in an embodiment, breaking down the number of candidate noise sequences into subsets of unmultiplexed noise sequences to be done in a single correlation computation by combining such subsets into sets of multiplexed noise sequences may be desired so that the peaks are distinguishable from each other. Although multiple correlation computations may still be needed to determine all the candidate noise sequences, this embodiment still simplifies the complexity by requiring less computations to be done overall in comparison to doing one computation for each candidate noise sequence individually.

Figure 8:
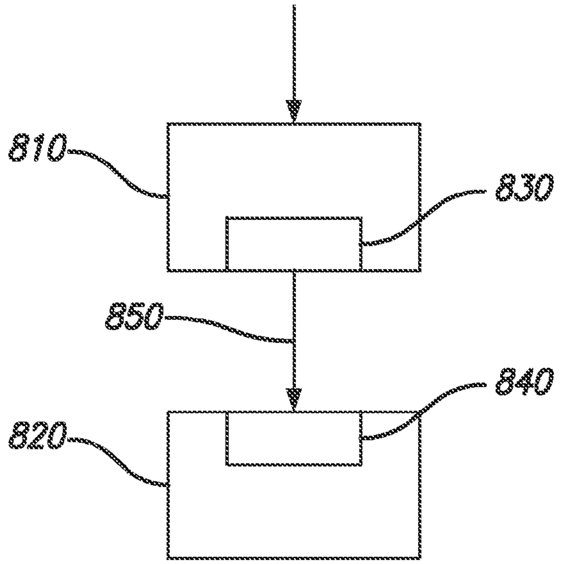
FIGS. 8-10 show examples of arrangements employing the embedding procedure or system of FIG. 1 and the detection method, operational sequence or system of FIG. 4.
Figure 9:
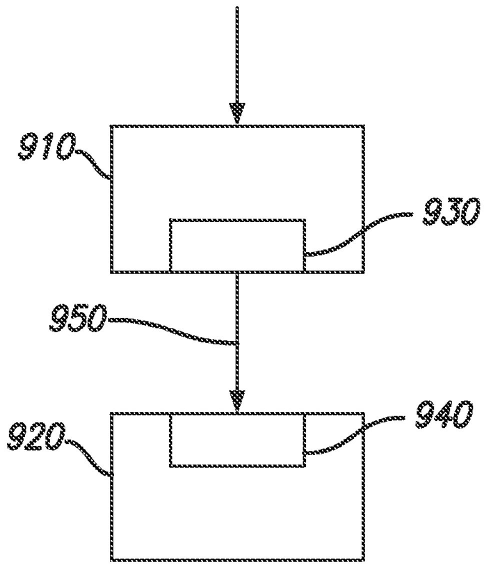
Figure 10:
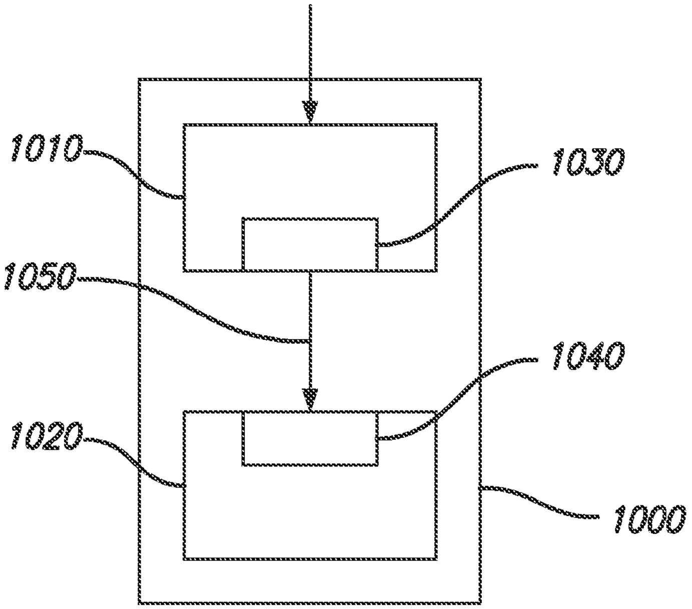

The embodiments discussed so far in the present application address the structure and function of the embedding and detection systems and methods of the present disclosure as such. The person skilled in the art will understand that such systems and methods can be employed in several arrangements and/or structures. By way of example and not of limitation. FIGS. 8-10 show some examples of such arrangements.

In particular, FIGS. 8 and 9 show conveyance of audio data with embedded watermark as metadata hidden in the audio between two different devices on the receiver side, such as a set top box (810) and an audio video receiver or AVR (820) in FIG. 8, or a first AVR (910) and a second AVR (920) in FIG. 9. In FIG. 8, the set top box (810) contains an audio watermark embedder (830) like the one described in FIG. 1, while the AVR (820) contains an audio watermark detector (840) like the one described in FIG. 4. Similarly, in FIG. 9, the first AVR (910) contains an audio watermark embedder (930), while the second AVR (920) contains an audio watermark detector (940). Therefore, processing in the second AVR (920) can be adapted according to the extracted metadata from the audio signal. Furthermore, unauthorized use of the audio signal (850) between the devices in FIG. 8 or the audio signal (950) between the devices in FIG. 9 will be recognized in view of the presence of the embedded watermark.

Similarly, FIG. 10 shows conveyance of audio data with embedded watermark metadata between different processes in the same operating system (such as Windows®, Android®, iOS® etc) of a same product (1000). An audio watermark is embedded (1030) in an audio decoder process (1010) and then detected (1040) in an audio post processing process (1020). Therefore, the post processing process can be adapted according to the extracted metadata from the audio signal.

The audio data hiding based on perceptual masking and detection based on code multiplexing of the present disclosure can be implemented in software, firmware, hardware, or a combination thereof. When all or portions of the system are implemented in software, for example as an executable program, the software may be executed by a general purpose computer (such as, for example, a personal computer that is used to run a variety of applications), or the software may be executed by a computer system that is used specifically to implement the audio data spread spectrum embedding and detection system.

Figure 11:
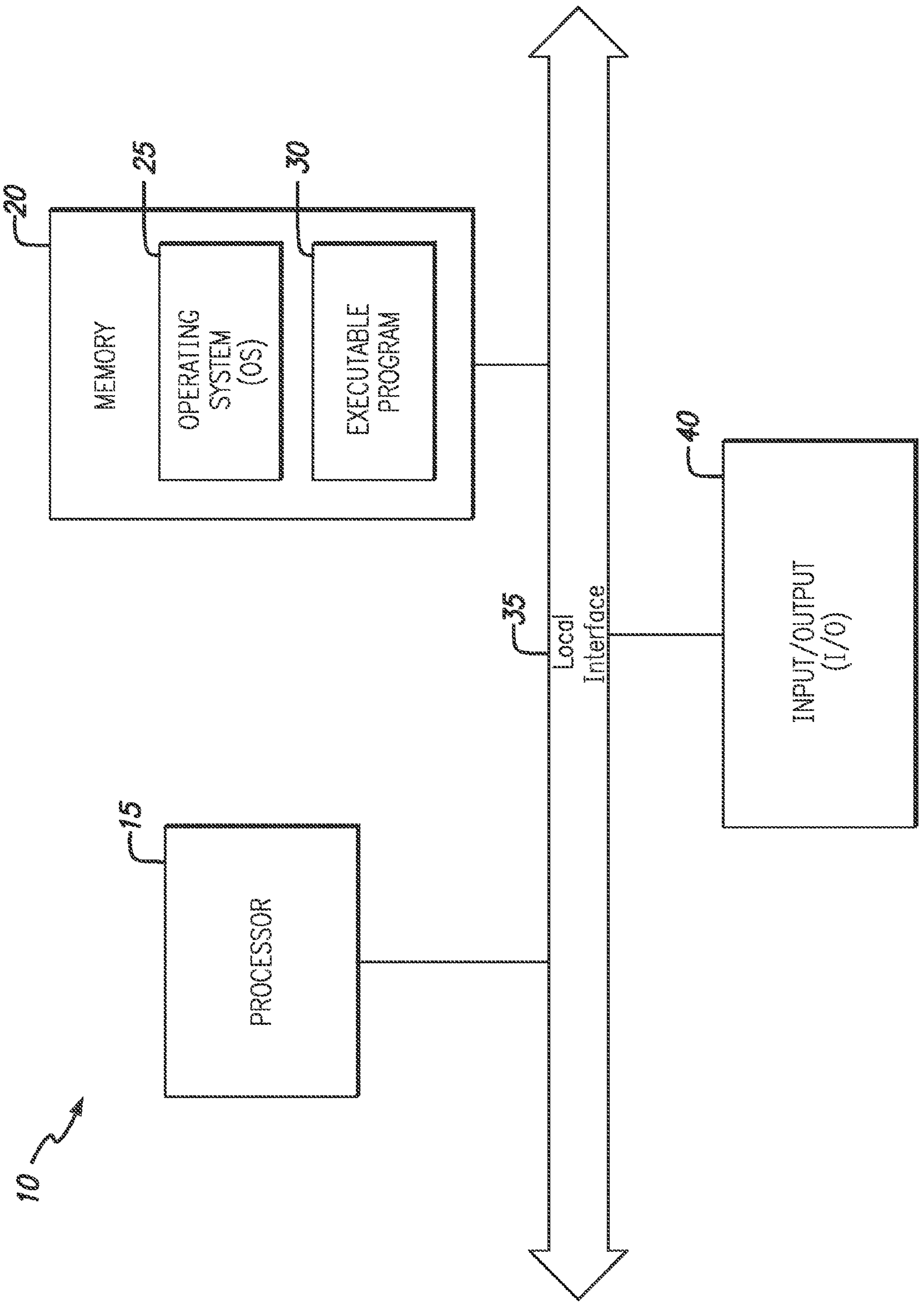
FIG. 11 shows a computer system that may be used to implement the audio data hiding based on perceptual masking and detection based on code multiplexing of the present disclosure.

FIG. 11 shows a computer system (10) that may be used to implement audio data hiding based on perceptual masking and detection based on code multiplexing of the disclosure. It should be understood that certain elements may be additionally incorporated into computer system (10) and that the figure only shows certain basic elements (illustrated in the form of functional blocks). These functional blocks include a processor (15), memory (20), and one or more input and/or output (I/O) devices (40) (or peripherals) that are communicatively coupled via a local interface (35). The local interface (35) can be, for example, metal tracks on a printed circuit board, or any other forms of wired, wireless, and/or optical connection media. Furthermore, the local interface (35) is a symbolic representation of several elements such as controllers, buffers (caches), drivers, repeaters, and receivers that are generally directed at providing address, control, and/or data connections between multiple elements.

The processor (15) is a hardware device for executing software, more particularly, software stored in memory (20). The processor (15) can be any commercially available processor or a custom-built device. Examples of suitable commercially available microprocessors include processors manufactured by companies such as Intel, AMD, and Motorola.

The memory (20) can include any type of one or more volatile memory elements (e.g., random access memory (RAM, such as DRAM, SRAM, SDRAM, etc.)) and nonvolatile memory elements (e.g., ROM, hard drive, tape, CDROM, etc.). The memory elements may incorporate electronic, magnetic, optical, and/or other types of storage technology. It must be understood that the memory (20) can be implemented as a single device or as a number of devices arranged in a distributed structure, wherein various memory components are situated remote from one another, but each accessible, directly or indirectly, by the processor (15).

The software in memory (20) may include one or more separate programs, each of which comprises an ordered listing of executable instructions for implementing logical functions. In the example of FIG. 11, the software in the memory (20) includes an executable program (30) that can be executed to implement the audio data spread spectrum embedding and detection system in accordance with the present disclosure. Memory (20) further includes a suitable operating system (OS) (25). The OS (25) can be an operating system that is used in various types of commercially-available devices such as, for example, a personal computer running a Windows® OS, an Apple® product running an Apple-related OS, or an Android OS running in a smart phone. The operating system (22) essentially controls the execution of executable program (30) and also the execution of other computer programs, such as those providing scheduling, input-output control, file and data management, memory management, and communication control and related services.

Executable program (30) is a source program, executable program (object code), script, or any other entity comprising a set of instructions to be executed in order to perform a functionality. When a source program, then the program may be translated via a compiler, assembler, interpreter, or the like, and may or may not also be included within the memory (20), so as to operate properly in connection with the OS (25).

The I/O devices (40) may include input devices, for example but not limited to, a keyboard, mouse, scanner, microphone, etc. Furthermore, the I/O devices (40) may also include output devices, for example but not limited to, a printer and/or a display. Finally, the I/O devices (40) may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer system (10) is a PC, workstation, or the like, the software in the memory (20) may further include a basic input output system (BIOS) (omitted for simplicity). The BIOS is a set of essential software routines that initialize and test hardware at startup, start the OS (25), and support the transfer of data among the hardware devices. The BIOS is stored in ROM so that the BIOS can be executed when the computer system (10) is activated.

When the computer system (10) is in operation, the processor (15) is configured to execute software stored within the memory (20), to communicate data to and from the memory (20), and to generally control operations of the computer system (10) pursuant to the software. The audio data spread spectrum embedding and detection system and the OS (25), in whole or in part, but typically the latter, are read by the processor (15), perhaps buffered within the processor (15), and then executed.

When the audio data hiding based on perceptual masking and/or detection based on code multiplexing is implemented in software, it should be noted that the audio data spread spectrum embedding and detection system can be stored on any computer readable storage medium for use by, or in connection with, any computer related system or method. In the context of this document, a computer readable storage medium is an electronic, magnetic, optical, or other physical device or means that can contain or store a computer program for use by, or in connection with, a computer related system or method.

The audio data hiding based on perceptual masking and/or detection based on code multiplexing can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any non-transitory tangible means that can store, communicate, propagate, or transport the program for use by or in connection with the instruction execution system, apparatus, or device. The computer readable storage medium can be, for example but not limited to, an electronic, magnetic, optical, electromagnetic, infrared, or semiconductor system, apparatus, or device. More specific examples (a non-exhaustive list) of the computer-readable storage medium would include the following: a portable computer diskette, a random access memory (RAM), a read-only memory (ROM), an erasable programmable read-only memory (EPROM, EEPROM, or Flash memory) an optical disk such as a DVD or a CD.

In an alternative embodiment, where the audio data hiding based on perceptual masking and detection based on code multiplexing is implemented in hardware, the audio data hiding based on perceptual masking and detection based on code multiplexing can implemented with any one, or a combination, of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The examples set forth above are provided to give those of ordinary skill in the art a complete disclosure and description of how to make and use the embodiments of the audio data hiding based on perceptual masking and detection based on code multiplexing of the disclosure, and are not intended to limit the scope of what the inventors regard as their disclosure. Modifications of the above-described modes for carrying out the disclosure can be used by persons of skill in the art, and are intended to be within the scope of the following claims.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications can be made without departing from the spirit and scope of the present disclosure. Accordingly, other embodiments are within the scope of the following claims.

What is claimed is:

1. A computer-implemented method to embed data in an audio signal, comprising:

selecting a pseudo-random sequence according to desired data bits to be embedded in the audio frame;

computing, by a processor, a masking curve based on the audio signal;

shaping a frequency spectrum of the pseudo-random sequence in accordance with the masking curve, thus obtaining a shaped frequency spectrum of the pseudo-random noise sequence;

detecting, for audio signal frames, presence or absence of transients; and adding, by a processor, the shaped frequency spectrum of the pseudo-random noise sequence to a frequency spectrum of the audio signal, the adding occurring on an audio signal frame by audio signal frame basis, wherein, for audio signal frames for which presence of a transient is detected, the shaped frequency spectrum of the pseudo-random noise sequence is not added to the frequency spectrum of the audio signal.

2. The method of claim 1, wherein the pseudo-random sequence is selected from a plurality of concatenated pseudo-random sequences according to the data bits to be embedded.

3. The method of claim 2, wherein the number of concatenated pseudo-random sequences (L) is a function of the number of bits (B) representing the data to be embedded in the audio signal.

4. The method of claim 3, wherein $B=\log_2 L$.

5. A non-transitory computer-readable storage medium having stored thereon computer-executable instructions executable by a processor to detect embedded data in an audio signal, comprising:

performing a phase-only correlation between a frequency spectrum of the audio signal with embedded data and a noise sequence; and performing a detection decision based on a result of the phase-only correlation, wherein the data embedded in the audio signal is embedded according to a method comprising:

selecting a pseudo-random sequence according to desired data bits to be embedded in the audio frame;

computing a masking curve based on the audio signal;

shaping a frequency spectrum of the pseudo-random sequence in accordance with the masking curve, thus obtaining a shaped frequency spectrum of the pseudo-random noise sequence;

detecting, for audio signal frames, presence or absence of transients; and adding the shaped frequency spectrum of the pseudo-random noise sequence to a frequency spectrum of the audio signal, the adding occurring on an audio signal frame by audio signal frame basis, wherein, for audio signal frames for which presence of a transient is detected, the shaped frequency spectrum of the pseudo-random noise sequence is not added to the frequency spectrum of the audio signal.

6. The non-transitory computer-readable storage medium according to claim 5, wherein the embedded data has been embedded based on one or more pseudo-random noise sequences of a plurality of a set of unmultiplexed pseudo-random noise sequences and the phase-only correlation is performed a plurality of times against a set of multiplexed pseudo-random noise sequences.

7. The non-transitory computer-readable storage medium of claim 6, wherein the set of multiplexed pseudo-random noise sequences comprises a smaller number of pseudo-noise sequences than the number of pseudo-noise sequences in the set of unmultiplexed pseudo-random noise sequences.

8. The non-transitory computer-readable storage medium according to claim 7, wherein the multiplexed noise sequences are derived from a subset of the set of unmultiplexed pseudo-noise sequences by circularly shifting each pseudo-noise sequence in the subset by a unique amount and accumulating.

9. The non-transitory computer-readable storage medium according to claims 7, wherein phase-only correlation between the frequency spectrum of the audio signal with embedded data and the frequency spectrum of the pseudo-random noise sequence is performed a number of times in relation to the number of multiplexed pseudo-random noise sequences.

10. The non-transitory computer-readable storage medium according to claim 9, wherein the number of times phase-only correlation is performed is one.

11. The non-transitory computer-readable storage medium according to claims 7, wherein performing phase-only correlation comprises:

computing a correlation between the noise sequences embedded in the audio signal and the set of multiplexed noise pseudo-random sequences; and identifying a location of a peak in a correlation value that relates to the data embedded in the audio signal.

12. A non-transitory computer-readable storage medium having stored thereon computer-executable instructions executable by a processor to detect embedded data in an audio signal, comprising:

performing a phase-only correlation between a frequency spectrum of the audio signal with embedded data and a noise sequence;

performing a detection decision based on a result of the phase-only correlation; and performing whitening of the audio signal with the embedded data before performing phase-only correlation, wherein the whitening of the audio signal is performed by dividing the complex number in each frequency bin (a+ib) by its absolute value $(\mathrm{sqrt}(a^2+b^2))$.

13. An audio signal receiving arrangement comprising a first device and a second device, the first device comprising a data embedder to embed data in the audio signal, the second device comprising a data detector to detect the data embedded in the audio signal and adapt processing on the second device according to the extracted data, the data embedder being operative to embed the data in the audio signal according to an embedding method, the data detector being operative to detect the watermark embedded in the audio signal according to a detecting method, the embedding method comprising:

i) selecting a pseudo-random sequence according to desired data bits to be embedded in the audio frame;

ii) computing a masking curve based on the audio signal;

iii) shaping a frequency spectrum of the pseudo-random sequence in accordance with the masking curve, thus obtaining a shaped frequency spectrum of the pseudo-random noise sequence;

iv) detecting, for audio signal frames, presence or absence of transients; and v) adding the shaped frequency spectrum of the pseudo-random noise sequence to a frequency spectrum of the audio signal, the adding occurring on an audio signal frame by audio signal frame basis, wherein, for audio signal frames for which presence of a transient is detected, the shaped frequency spectrum of the pseudo-random noise sequence is not added to the frequency spectrum of the audio signal, the detecting method comprising:

i) performing a phase-only correlation between a frequency spectrum of the audio signal with embedded data and a noise sequence; and ii) performing a detection decision based on a result of the phase-only correlation.

14. The audio signal receiving arrangement of claim 13, wherein the first device is a set top box, and the second device is an audio video receiver separate from the set top box.

15. The audio signal receiving arrangement of claim 13, wherein the first device is a first audio video receiver, and the second device is a second audio video receiver separate from the first audio video receiver.

16. An audio signal receiving product comprising a computer system having an executable program executable to implement a first process and a second process, the first process embedding data in the audio signal, the second process detecting the data embedded in the audio signal, the second process being adapted according to the detected data, the first process operating according to an embedding method, the second process operating according to a detecting method, the embedding method comprising:

i) selecting a pseudo-random sequence according to desired data bits to be embedded in the audio frame;

ii) computing, by a processor, a masking curve based on the audio signal;

iii) shaping a frequency spectrum of the pseudo-random sequence in accordance with the masking curve, thus obtaining a shaped frequency spectrum of the pseudo-random noise sequence;

iv) detecting, for audio signal frames, presence or absence of transients; and v) adding, by a processor, the shaped frequency spectrum of the pseudo-random noise sequence to a frequency spectrum of the audio signal, the adding occurring on an audio signal frame by audio signal frame basis, wherein, for audio signal frames for which presence of a transient is detected, the shaped frequency spectrum of the pseudo-random noise sequence is not added to the frequency spectrum of the audio signal, the detecting method comprising:

i) performing a phase-only correlation between a frequency spectrum of the audio signal with embedded data and a noise sequence; and ii) performing a detection decision based on a result of the phase-only correlation.

17. A system to embed data in an audio signal, the system comprising:

a processor configured to:

select a pseudo-random sequence according to desired data bits to be embedded in the audio frame;

compute a masking curve based on the audio signal;

shape a frequency spectrum of the pseudo-random sequence in accordance with the masking curve, thus obtaining a shaped frequency spectrum of the pseudo-random noise sequence;

detect, for audio signal frames, presence or absence of transients; and add the shaped frequency spectrum of the pseudo-random noise sequence to a frequency spectrum of the audio signal, the adding occurring on an audio signal frame by audio signal frame basis, wherein, for audio signal frames for which presence of a transient is detected, the shaped frequency spectrum of the pseudo-random noise sequence is not added to the frequency spectrum of the audio signal.

18. The system according to claim 17, further comprising:

a memory for storing computer-executable instructions accessible by said processor for embedding the data in the audio signal; and an input/output device configured to, at least, receive the audio signal and provide the audio signal to the processor.

* * * * *